United States Patent [19]

Wight et al.

[11] Patent Number: 5,504,523
[45] Date of Patent: Apr. 2, 1996

[54] ELECTRONIC IMAGE UNSTEADINESS COMPENSATION

[75] Inventors: Ralph H. Wight, Asharoken, N.Y.; James C. McGlone, Pittsburgh, Pa.

[73] Assignee: Loral Fairchild Corporation, Syosset, N.Y.

[21] Appl. No.: 139,088

[22] Filed: Oct. 21, 1993

[51] Int. Cl.$^6$ ................................................. H04N 5/228
[52] U.S. Cl. ........................... 348/208; 382/254; 382/294
[58] Field of Search ........................ 348/208, 207, 348/155, 699; 382/54, 44, 42, 254, 294, 278; H04N 5/253, 5/228

[56] References Cited

U.S. PATENT DOCUMENTS

| | | | |
|---|---|---|---|
| 4,612,575 | 9/1986 | Ishman et al. | 348/208 |
| 5,012,347 | 4/1991 | Fournier | 348/208 |

*Primary Examiner*—Joseph Mancuso
*Assistant Examiner*—Tuan V. Ho
*Attorney, Agent, or Firm*—Sterne, Kessler, Goldstein & Fox

[57] ABSTRACT

The present invention is directed to a system and method for reducing image smear in an image which has been electronically collected by a TDI detector. In particular, the present invention is directed to an electronic imager having a charge accumulation device, such as a TDI detector. The charge accumulation device stores a row of electrical charges representing a sensed image. The charges are blurred due to motion of the electronic imager. The imager also includes a shift register for generating a blurred video line by concatenating the blurred charges. The blurred video line includes a series of pixel values proportional to the blurred charges. The imager also includes an image unsteadiness compensation for correcting the blurred video line. The image unsteadiness compensator generally operates as follows. First, the image unsteadiness compensator receives motion information from sensors, wherein the motion information describes the motion of the electronic imager. Then, the image unsteadiness compensator computes image wander of the blurred charges by using the motion information. Next, the image unsteadiness compensator generates a corrected video line from the blurred video line by using the image wander computation.

18 Claims, 12 Drawing Sheets

FIG. 10

$$\begin{bmatrix} K1 & K2 & 0 & 0 & 0 & 0 & 0 & 0 & 0 & 0 \\ 0 & K1 & K2 & 0 & 0 & 0 & 0 & 0 & 0 & 0 \\ 0 & 0 & K1 & K2 & 0 & 0 & 0 & 0 & 0 & 0 \\ 0 & 0 & 0 & K1 & K2 & 0 & 0 & 0 & 0 & 0 \\ 0 & 0 & 0 & 0 & K1 & K2 & 0 & 0 & 0 & 0 \\ 0 & 0 & 0 & 0 & 0 & K1 & K2 & 0 & 0 & 0 \\ 0 & 0 & 0 & 0 & 0 & 0 & K1 & K2 & 0 & 0 \\ 0 & 0 & 0 & 0 & 0 & 0 & 0 & K1 & K2 & 0 \\ 0 & 0 & 0 & 0 & 0 & 0 & 0 & 0 & K1 & K2 \\ 0 & 0 & 0 & 0 & 0 & 0 & 0 & 0 & 0 & K1 & K2 \end{bmatrix} \times \begin{bmatrix} C1 \\ C2 \\ C3 \\ C4 \\ C5 \\ C6 \\ C7 \\ C8 \\ C9 \\ C10 \\ D \end{bmatrix} = \begin{bmatrix} UC1 \\ UC2 \\ UC3 \\ UC4 \\ UC5 \\ UC6 \\ UC7 \\ UC8 \\ UC9 \\ UC10 \end{bmatrix}$$

1002 — matrix; 1004 — C vector; 1006 — UC vector

ELECTRONIC IMAGE UNSTEADINESS COMPENSATION

BACKGROUND OF THE INVENTION

1. Field of the Invention

The present invention relates generally to camera imagers (such as photographic cameras), and, more particularly, to an electronic system and method for compensating for image unsteadiness in camera imagers.

2. Related Art

In using camera imagers to electronically collect sensed images, the length of time during which a patch of object space is imaged onto a corresponding angularly-sized pixel is referred to as the exposure time. The signal level generated by the camera imager is directly proportional to this exposure time. Thus, all other things being equal, longer exposure times produce larger signal levels. Larger signal levels have better pixel-to-pixel signal-to-noise ratios relative to those having shorter exposure times.

However, as exposure time is increased, two problems arise. First, the area of the scene which can be covered or scanned per unit time becomes restricted, sometimes to the point of diminished system utility. Second, the amount of image smear resulting from vehicle perturbations may increase. If this image smear is not compensated for, it may reduce image quality.

Conventional techniques have solved the first problem by using time delay and integration (TDI) detectors. TDI detectors effectively increase available exposure time by accumulating a larger amount of charge while eliminating the penalty of minimizing coverage. This desirable result is obtained because a sensor using a number (N) of TDI stages can scan N times as fast as a corresponding linear detector. These multiple stages enable multiple coverage of the same portion of the scene, resulting in a charge which is proportional to the number of TDI stages used. Thus, a TDI detector provides approximately N times the angular coverage of a corresponding linear detector which utilizes the same total exposure time. The use of TDI detectors, however, does not solve the second problem. Specifically, the use of TDI detectors does not eliminate the effects of image smear (also referred to as image unsteadiness) as a function of total exposure time.

Conventional systems which have been employed to stabilize unsteadiness and avoid image smear use mechanical or optomechanical methods to stabilize the sensor with respect to the object space. In many instances, however, it is difficult to achieve the desired tolerance levels. Subsequently, the exposure time and number of TDI integrators which may be effectively employed are negatively impacted. This can often be the limiting factor on system performance and mission satisfaction. Therefore, an effective and efficient system and method for compensating for image unsteadiness is required.

SUMMARY OF THE INVENTION

The present invention is directed to a system and method for reducing image smear in an image which has been electronically collected by a TDI detector. In particular, the present invention is directed to an electronic imager having a charge accumulation device, such as a TDI detector. The charge accumulation device stores a row of electrical charges representing a sensed image. The charges are blurred due to motion of the electronic imager relative to the image scene which leads to image wander and contamination of pixels. The resulting TDI detector output is a blurred video line.

The imager includes a shift register for generating a blurred video line by concatenating the blurred charges. The blurred video line includes a series of pixel values proportional to the blurred charges.

The imager also includes an image unsteadiness compensator for correcting the blurred video line. The image unsteadiness compensator generally operates as follows. First, the image unsteadiness compensator receives motion information from sensors, wherein the motion information describes the motion of the image falling on the electronic imager (due to the motion of the electronic imager). Then, the image unsteadiness compensator computes image wander of the blurred charges by using the motion information. Next, the image unsteadiness compensator generates a corrected video line from the blurred video line by using the image wander computation.

According to a preferred embodiment, the image unsteadiness compensator, as generally described above, is implemented according to the following theory. The blurred line is considered to be a convolution of the corrected line and a blur kernel. The blurred line is known. Therefore, the image unsteadiness compensator generally operates by first determining the blur kernel. Then, the image unsteadiness compensator uses the blur kernel to perform a deconvolution of the blurred line in order to generate the corrected line.

The present invention includes two embodiments for performing the deconvolution. The first embodiment involves a spatial approach. The second embodiment involves a frequency approach.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein:

FIG. 10 illustrates an example matrix equation which is used to calculate a set of linear equations for use with the spatial approach;

DETAILED DESCRIPTION OF THE PREFERRED EMBODIMENTS

Figure 1:
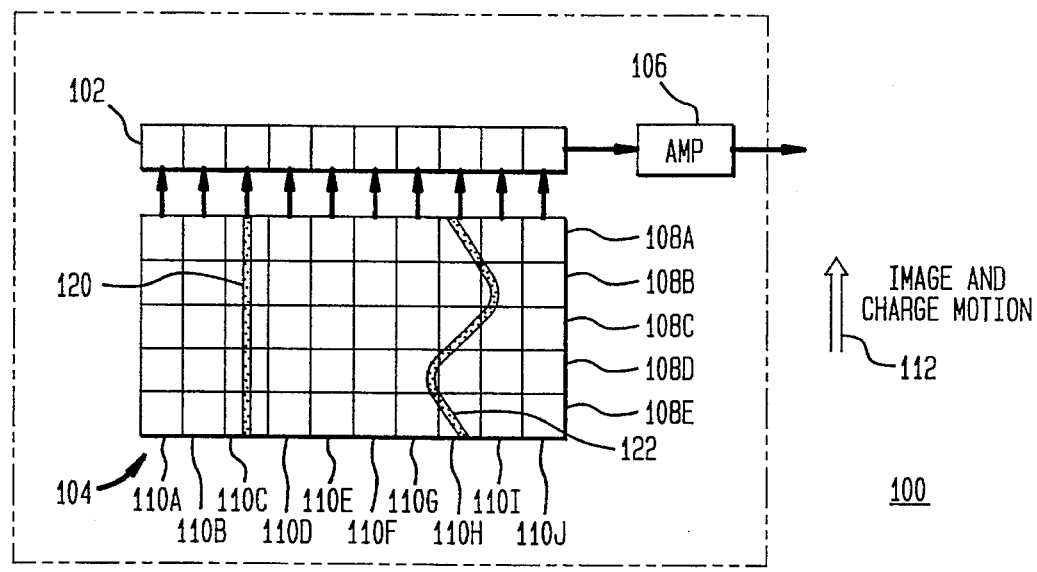
FIG. 1 illustrates a conventional camera imager.

FIG. 1 illustrates the effects of image smear in a camera imager 100. Camera imager 100 includes a shift register 102, a TDI detector 104, and an amplifier 106. TDI detector 104 includes multiple stages 108A through 108E (collectively and generally referred to as 108). The stages include multiple columns 110A through 110J (collectively and generally referred to as 110). An image produced by a scanning sensor (not shown in FIG. 1) enters the TDI detector 104 at the bottom stage 108E and proceeds smoothly toward the top stage 108A. The charges are moved in nominal synchronism with the image so that five times the total charge is generated (as compared to a single linear detector) by the time the image has traversed all five of the TDI stages 108 shown.

The summed charge is then transferred to shift register 102 and subsequently output to amplifier 106 during the interval required for the next line of image charges to reach the shift register 102 from TDI detector 104. The entire process is pipeline in nature such that each pixel always has some part of an image incident upon it. The mechanism by which the charges are synchronized with the image usually involves a multi-phase transfer process which approximates a completely smooth motion of the charge in the direction indicated by arrow 112.

The ideal motion of an unperturbed image patch is shown in column 110C by image path 120. The image following image path 120 moves smoothly in both direction (and time) from the point of entering the TDI detector 104 to the point where it is transferred into shift register 102. This represents what would occur in the absence of all image unsteadiness.

What occurs in the presence of uncompensated image unsteadiness is referred to as image wander and is represented in FIG. 1 by image path 102. The associated image patch is not confined to a single column (that is, column 110H), but wanders and contaminates columns 110G and 110I as well. Since all portions of an image scene which are adjacent to each other are essentially moving together, columns 110G and 110I contaminate column 110H in a similar fashion.

Image smear reduces the modulation transfer function (MTF) of a camera imager. MTF is the Fourier transform of the line spread function. Image smear reduces MTF in accordance with the expression given below in equation (1).

$$MTF_{smear} = \frac{\sin \pi \dot{\Theta} t f R}{\pi \dot{\Theta} t f R} \quad \text{(Equation 1)}$$

where:

$\dot\Theta$=image unsteadiness (radians/second)

t=total (integrated) exposure time (seconds)

f=focal length (millimeters)

R=spatial frequency (cycles/ram)

Image smear is introduced by a number of disturbances. For example, if the platform on which the camera imager is located is in an aircraft, these disturbances include roll, pitch, yaw, forward motion compensation (FMC), angle of attack, and drift angle. These disturbances are well known in the art.

Figure 2:
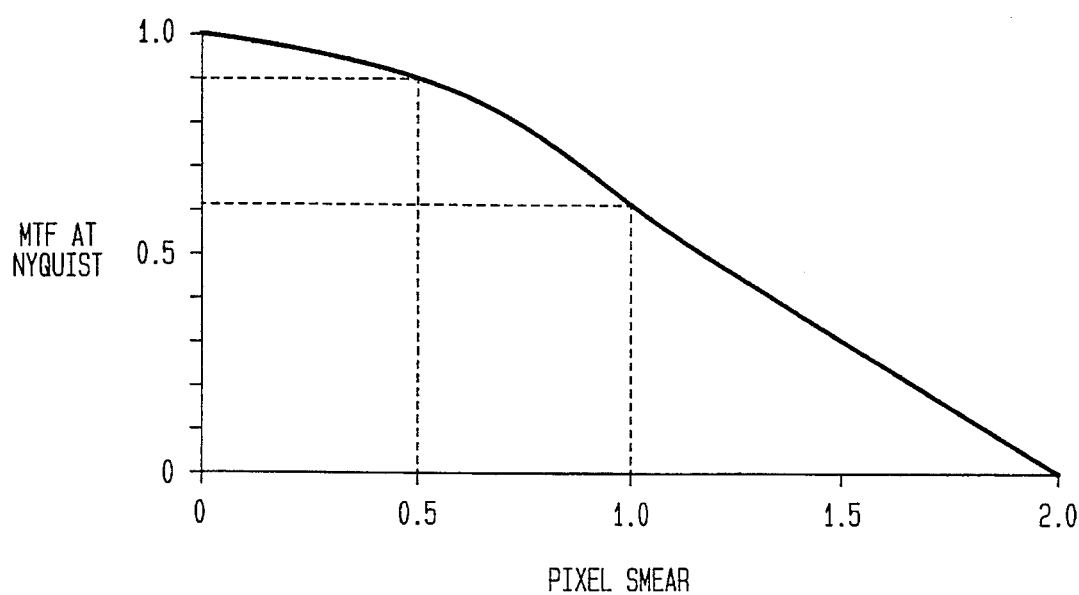
FIG. 2 illustrates the manner in which a modulation transfer function (MTF) at the Nyquist frequency is degraded by image smear.

FIG. 2 illustrates the manner in which a modulation transfer function at the Nyquist frequency is degraded by image smear. The general form of the curve is that of a sine function. At an image smear of one pixel, the Nyquist MTF is reduced to 63%. With a smear of two pixels, the Nyquist MTF is zero. Thus, the system limitation to correcting image wander is the signal-to-noise ratio at each pixel. The amount of image wander may not exceed ±2 pixels if useful compensation is to be achieved. According to the preferred embodiment, the present invention reduces the effective image smear to one half a pixel or less. Thus, as shown in FIG. 2, the Nyquist MTF is 90% at a total smear of one half pixel.

Figure 3:
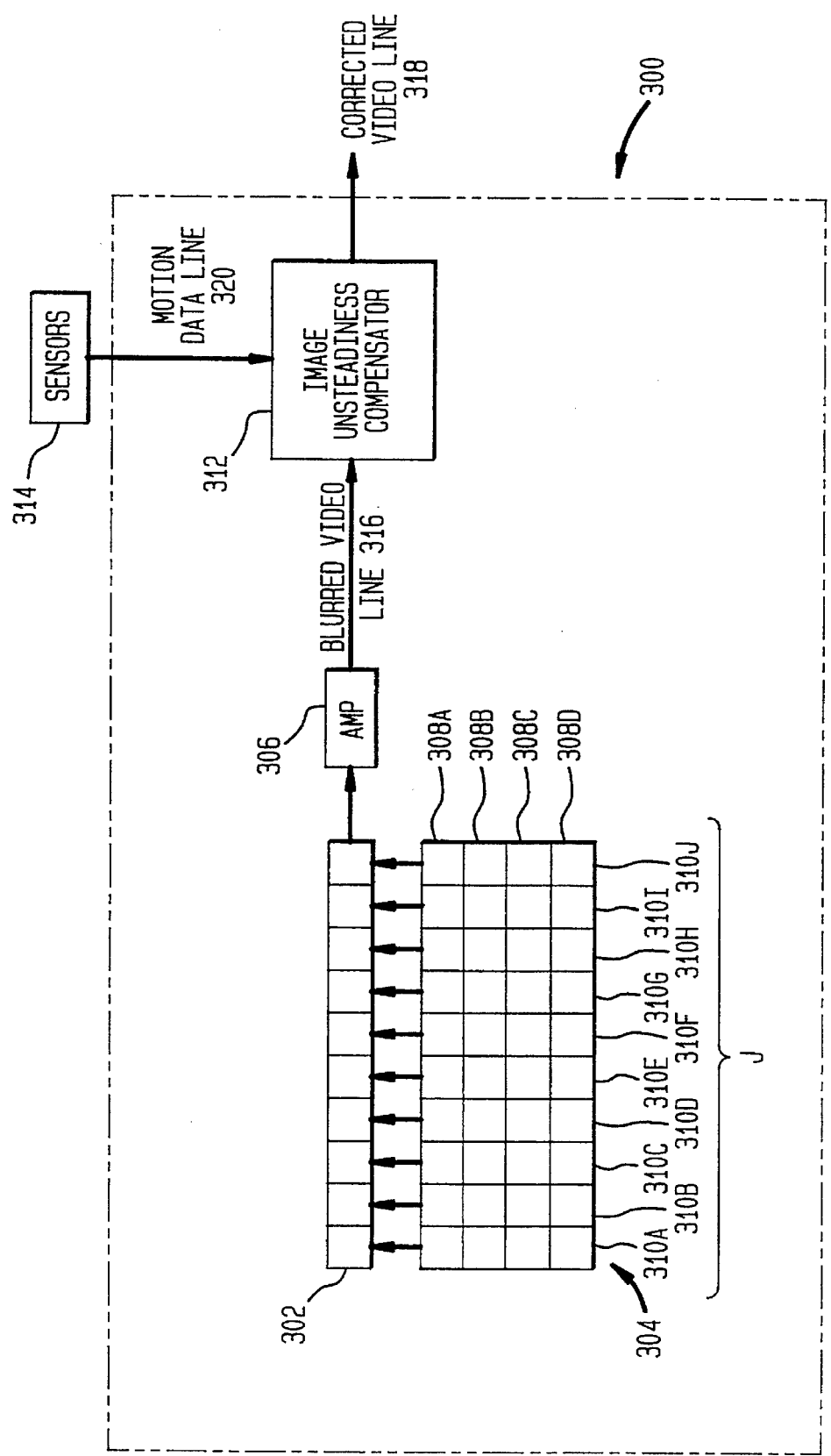
FIG. 3 illustrates a camera imager according to the present invention.

FIG. 3 illustrates a camera imager 300 according to the present invention. Camera imager 300 includes a shift register 302, a TDI detector 304, an amplifier 306, and an image unsteadiness compensator 312. TDI detector 304 contains multiple stages 308A through 308D (collectively and generally referred to as 308). Stages 308 are divided into columns 310A through 310J (collectively and generally referred to as 310). In the preferred embodiment of the present invention, TDI detector 104 has four stages 108A–108D. This has been found to be the optimal number of stages to reduce the impact on MTF. However, as one skilled in the relevant art would know, TDI detector 104 may have any number of stages.

Figure 4:
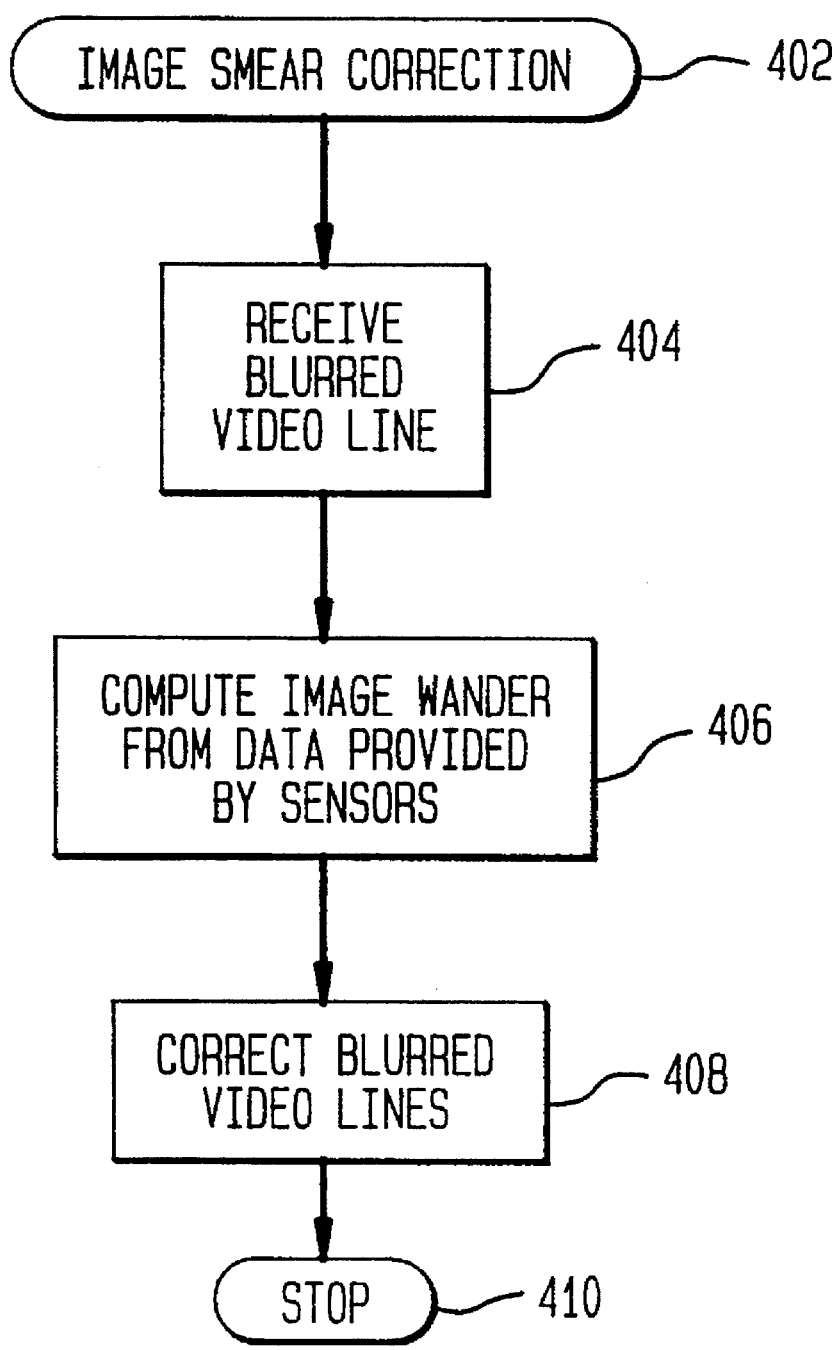
FIG. 4 illustrates the general operation of the image unsteadiness compensator of the present invention.

The image unsteadiness compensator 312 receives motion information on a motion data line 320 from sensors 314. The structure and operation of shift register 302, TDI detector 304, and amplifier 306 are well known in the art and operate as described with reference to FIG. 1. The general operation of image unsteadiness compensator 312 shall now be described with reference to the flowchart illustrated in FIG. 4 In the block diagram illustrated in FIG. 13.

Step 402 indicates the initiation of the image smear correction process. In step 404, image unsteadiness compensator 312 receives a blurred video line over line 316 from amplifier 306. Blurred video line 316 includes a series of pixel values which are proportional to the charges in shift register 302. Blurring of the video line 316 is due to the platform disturbances described above.

Figure 13:
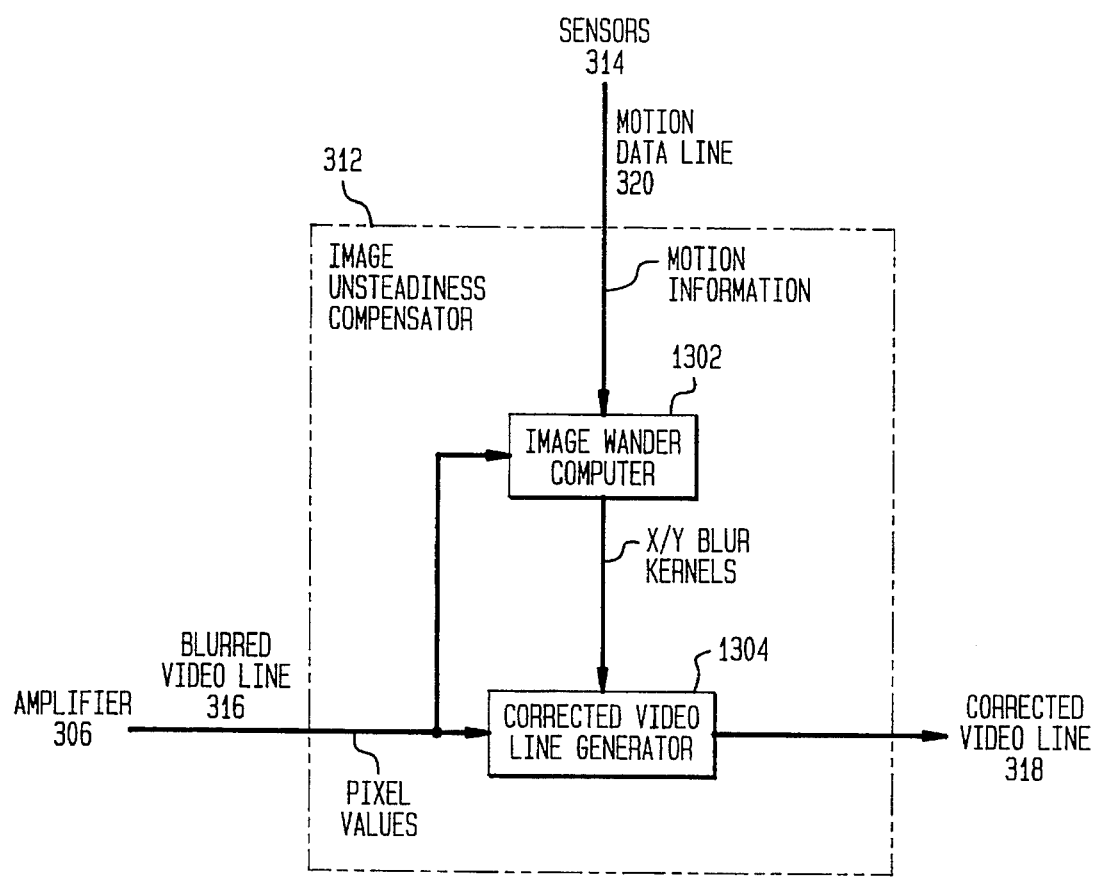
FIG. 13 illustrates a block diagram of the image unsteadiness compensator.

In step 406, the image wander computer 1302 in the image unsteadiness compensator 312 computes the degree of image wander by using the motion information transmitted on motion data line 320 from sensors 314. This is shown in FIG. 13 as image wander computer 1302. The image wander was described above with reference to columns 110G, 110H and 110I in FIG. 1. For example, image wander may occur when camera imager 301 is located on an airborne platform, the motion of which causes the image wander. The sensors 304, which may be well-known gyros, sense the motion of the platform. The motion information transmitted on motion data line 320 quantifies this platform motion.

In step 408, the corrected video line generator 1304 in the image unsteadiness compensator 312 generates a corrected video line 318 by using a image wander computation (discussed below) to correct blurred video line 316. This is shown in FIG. 13 as corrected video line generator 1304. The image smear correction process is then completed at step 410.

According to the preferred embodiment, image unsteadiness compensator 312, as generally described above, is implemented according to the following theory.

Figure 5:
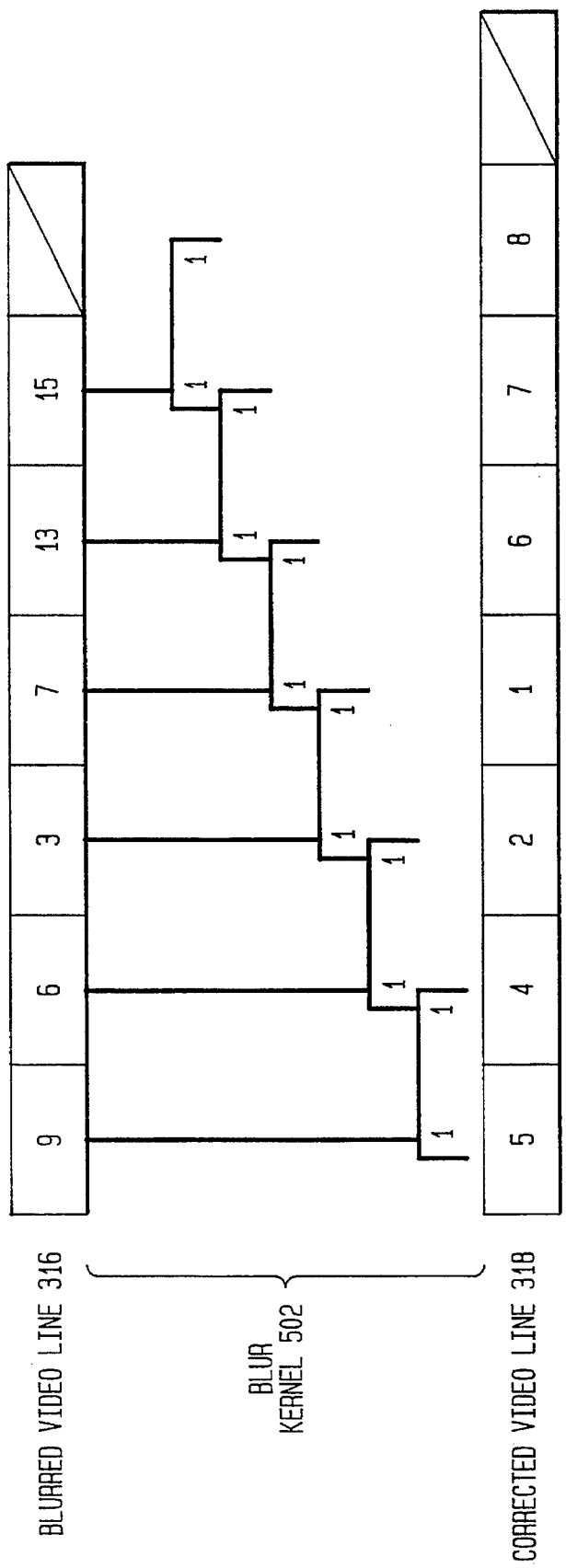
FIG. 5 illustrates portions of an example corrected line, blurred line, and blur kernel.

The blurred video line 316 is considered to be a convolution of a corrected video line 318 and a blur kernel (not shown in FIG. 3). This is illustrated in FIG. 5, which illustrates portions of an example corrected video line 318, blurred video line 316, and a blur kernel 502. Each element of the blurred video line 316 is determined by convolving two elements of corrected video line 318 with two elements of the blur kernel 504 (for example, 5*1+ 4*1=9 and 4*1+2*1=6).

The blurred video line 316 is transmitted from amplifier 306. Therefore, image unsteadiness compensator 312 generally operates by first determining blur kernel 502. Then, the corrected video line generator 1304 in the image unsteadiness compensator 312 uses this blur kernel to perform a deconvolution of the blurred video line 316 in order to generate the corrected video line 318. This is shown in FIG. 13 as corrected video line generator 1304.

At each TDI stage, the theoretical center of the pixel is offset from the center of the focal place element as a function of the orientation of the aircraft and of the servo errors. The output line consists of the sum of these shifted TDI stages. It is assumed that the error can be decomposed into a constant x shift (parallel to the long axis of the focal plane) and a y shift which varies with distance from the center of the focal plane.

Maximum value for $\delta_{fmc}$ was assumed to be 1,800 μradians/second. For 16 TDI stages and a 1 millisecond exposure, the total FMC error will be 28.8 μradians. The roll servo error, $\delta_{roll}$=500 μradians/second. For 16 TDI stages and a 1 millisecond exposure, the total roll error will be 8.0 μradians. The rotational error, $\delta_{rot}$, is assumed to be 900 μradians/second, or 14.4 μradians during the exposure. The analysis does not include terms for uncompensated angle of attack or drift, under the assumption that they are removed by the pointing mirror.

The image motion errors may be reduced to "X" motion components, "Y" motion components, and rotational components (having both "X" and "Y" terms). According to the present invention, the image motion errors are represented according to two equations (2) and (3) below.

$$\delta_x = f\delta_{FMC} \quad \text{(Equation 2)}$$

$$\delta_y = (f\delta_{roll}) + \delta_{rot} \quad \text{(Equation 3)}$$

where:

$\delta_{FMC}$=error in Forward Motion Component $\delta_{roll}$=error in Roll $\delta_{rot}$=error in Rotation f=focal length x=x coordinate distance from center y array These calculations must be repeated for each TDI stage used, for each line and the results accumulated.

The maximum $\delta_x$ shift, using these values, is 1.2 pixels and the maximum $\delta_y$ shift is 0.3 pixels at the center of the array and 0.4 pixels at the ends.

Since the $\delta_y$ is a function of the Z coordinate, the shift changes across the focal plane, theoretically necessitating a different convolution kernel for each pixel. Instead, we can pick a tolerance of 0.1 pixel smear, and since the maximum Y shift is less than 1 pixel we can divide each half of the focal plane into 10 regions, each of which has the same shift within the region. The shift will be symmetrical on each side of the array center.

As Equations (2) and (3) indicate, $\delta_x$ is represented by a single X motion component: forward motion correction (FMC). Rotational components in the X direction are negligible. Thus, $\delta_x$ does not vary among the pixels in the blurred video line 316.

$\delta_y$ is represented by a Y motion component (that is, roll) and a rotational component. The roll component does not vary among pixels in the blurred video line 316. However, the rotational component does vary with pixels (that is, position) among the line 308.

Equations (2) and (3) do not include terms for all disturbances, such as angle of attack and drift (which are assumed to be removed by a pointing mirror). These disturbances result in some geometric distortion but do not significantly degrade resolution. However, Equations (2) and (3) could be easily extended to include terms for other disturbances by using well-known mathematical relationships for these disturbances.

Figure 6:
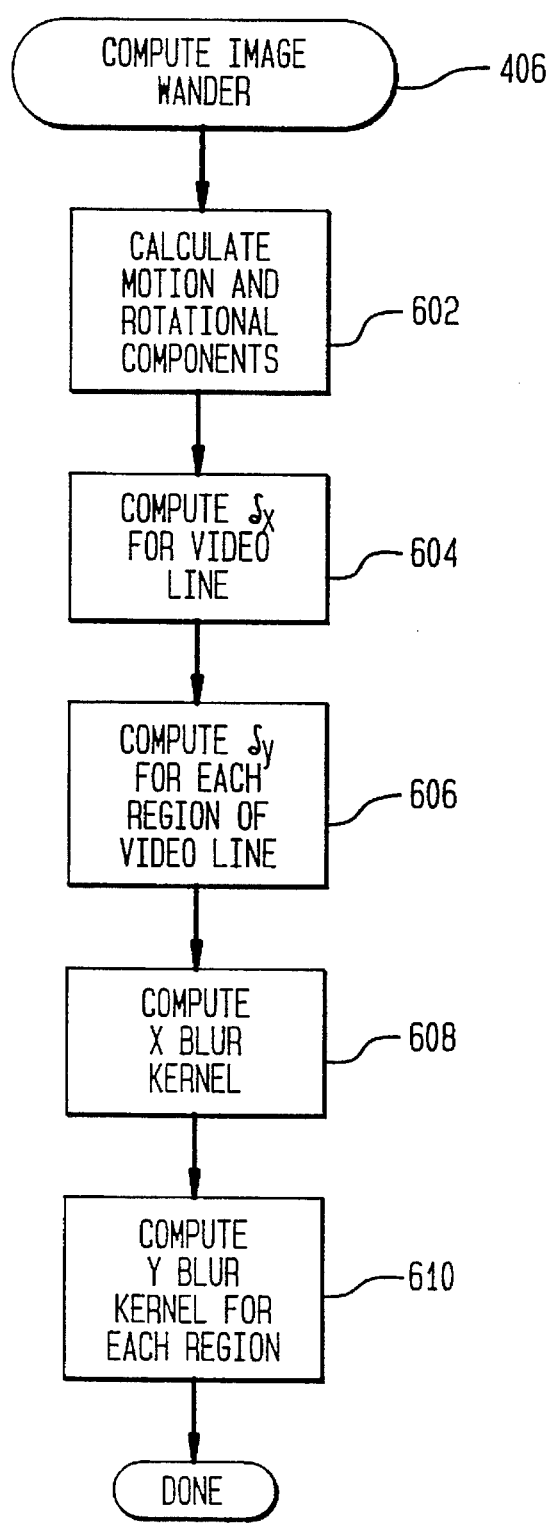
FIG. 6 illustrates in greater detail the operation of the image unsteadiness compensator of the present invention.
Figure 14:
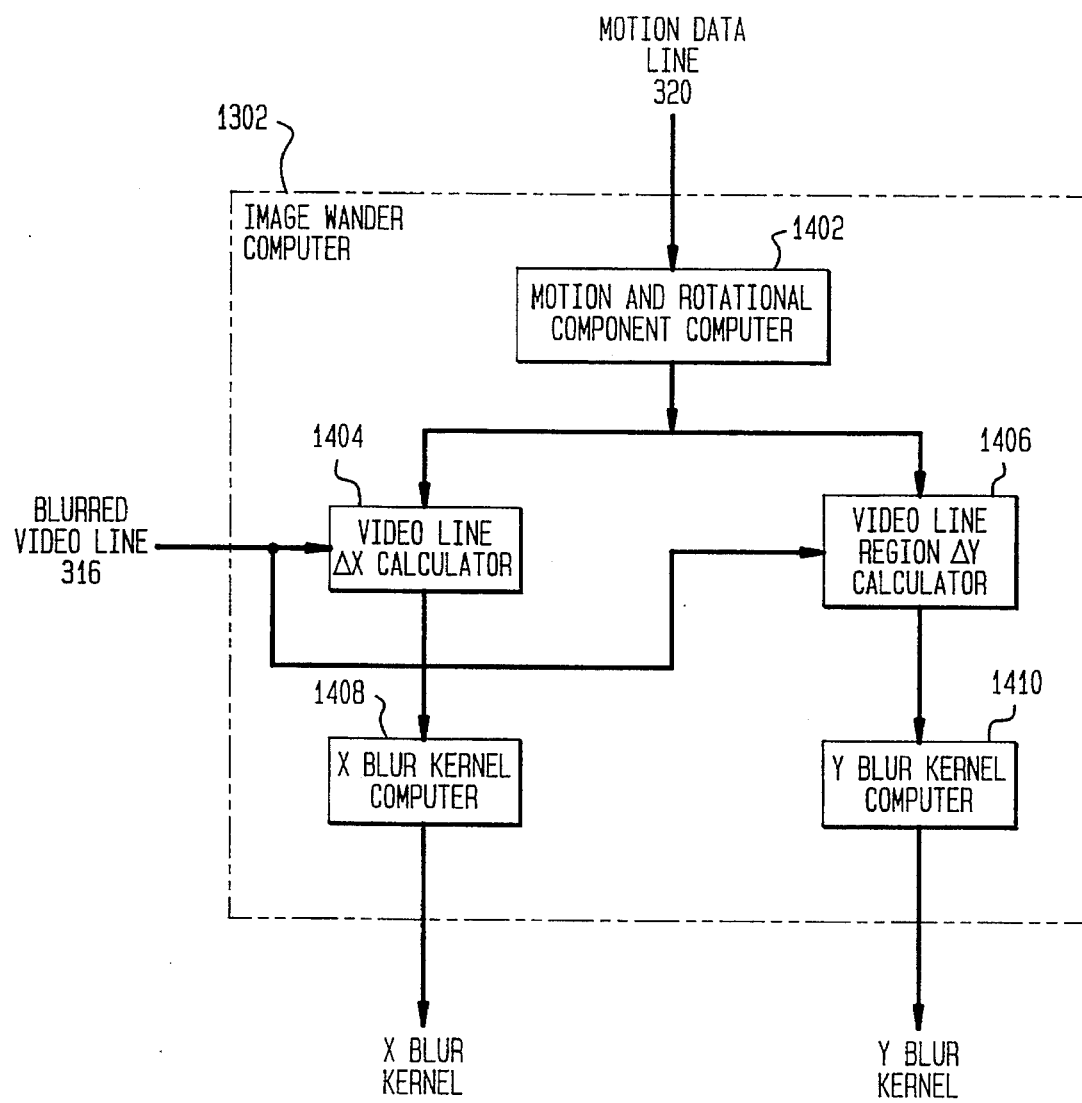
FIG. 14 illustrates a block diagram of the image wander computer.

FIG. 14 is a block diagram of the image wander computer 1302. FIG. 6 is a flowchart further illustrating step 406, the computation of image wander, performed by Image wander computer 1302 of the image unsteadiness compensator 312. Step 406 is illustrated as the entry point into this sequence of steps in FIG. 6. At this point, the image unsteadiness compensator 312 has received blurred video line 316 from the amplifier 306 as illustrated in step 404 of FIG. 4.

In step 602, the motion and rotational components computer 1402 in the image unsteadiness compensator 312 uses the motion information received from sensors 314 over motion dam line 320 to calculate the motion and rotational components (that is, $\delta_{FMC}$, $\delta_{roll}$ and $\delta_{rot}$). This is shown in FIG. 14 as motion and rotational components computer 1402.

In step 604, the video line $\Delta X$ calculator 1404 in the image unsteadiness compensator 312 uses the results of step 602 to compute $\delta_x$ for blurred video line 316 (described below). This is shown in FIG. 14 as video line $\Delta X$ calculator 1404.

According to the preferred embodiment, the blurred video line 316 is divided into a number of regions. In step 606, the video line region $\Delta Y$ calculator 1406 in the image unsteadiness compensator 312 uses the results of step 602 to a $\delta_y$ value for each region. This is shown in FIG. 14 as video line region $\Delta Y$ calculator 1406. Specifically, for each region, a pixel from the region is selected to calculate the $\delta_y$ value for the region (preferably, the center pixel in each region is used). In the preferred embodiment of the present invention, there are 10 regions.

In step 608, the X blur kernel computer 1408 in the image unsteadiness compensator 312 computes an X blur kernel (described below). The X blur kernel is used in subsequent steps to correct the blurred video line 316 for disturbances in the X direction. This is shown in FIG. 14 as X blur kernel computer 1408. The manner in which the X blur kernel is calculated will be described with reference to FIG. 7, which graphically illustrates a portion of the blurred video line 316.

Figure 7:
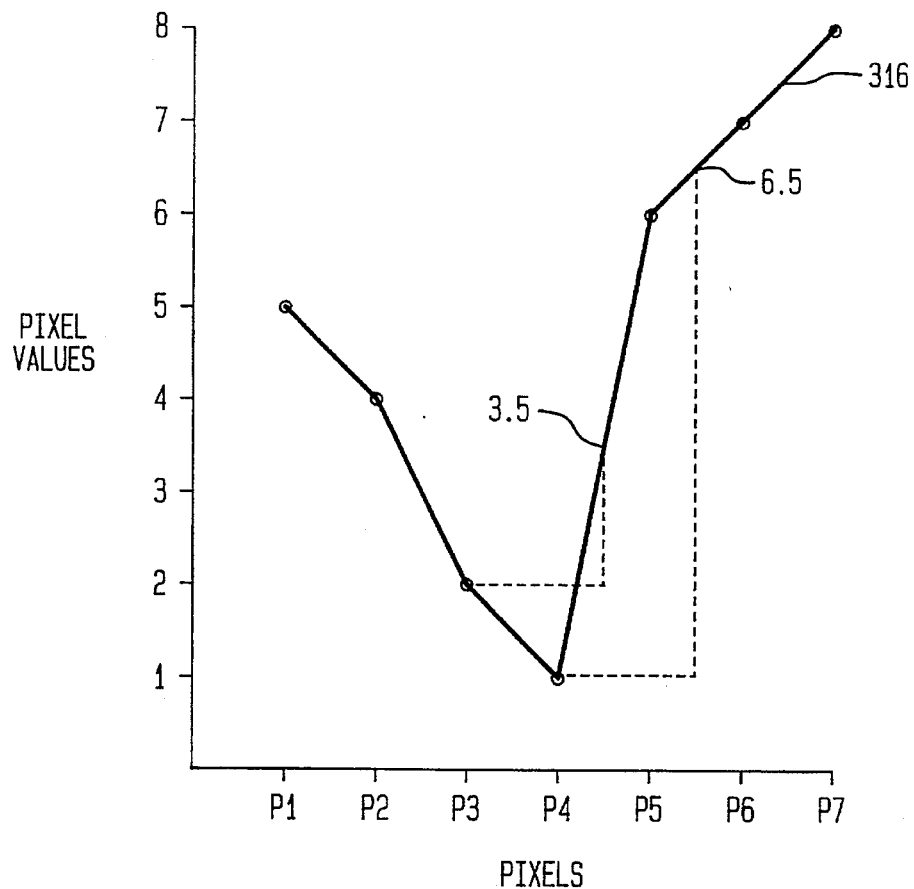
FIG. 7 graphically illustrates a portion of a blurred video line 316.

Referring to FIGS. 5 and 7, blurred video line 316 has pixels P1, P2, P3, P4, P5, P6 and P7 with values 5, 4, 2, 1, 6, 7 and 8, respectively. Assume that $\Delta X$ (as calculated in step 604) is 1.5 pixels. This means that the pixels have been shifted by 1.5 pixels in the X direction. Therefore, P3 has a blurred value of 2. Its unblurred value is 3.5, which represents a shift of 1.5 pixels. Likewise, P4 has a blurred value of 1. Moving 1.5 pixels to the right, it is evident that P4 has an unblurred value of 6.5. The shift of 1.5 pixels is equivalent to a deconvolution with a blur kernel of 0,0,0,0,0,0.5, 0.5.

Returning to FIGS. 6 and 14, in step 610, the Y blue kernel computer 1410 in the image unsteadiness compensator 312 calculates a Y blur kernel for each region of blurred video line 316. This is shown in FIG. 14 as Y blur kernel computer 1410. The Y blur kernel in a region is calculated in a manner similar to which the X blur kernel is calculated (in step 608), except y values are used to calculate the Y blur kernel. The Y blur kernels are used in subsequent steps to correct the blurred video line 316 for disturbances in the Y direction.

Figure 8:
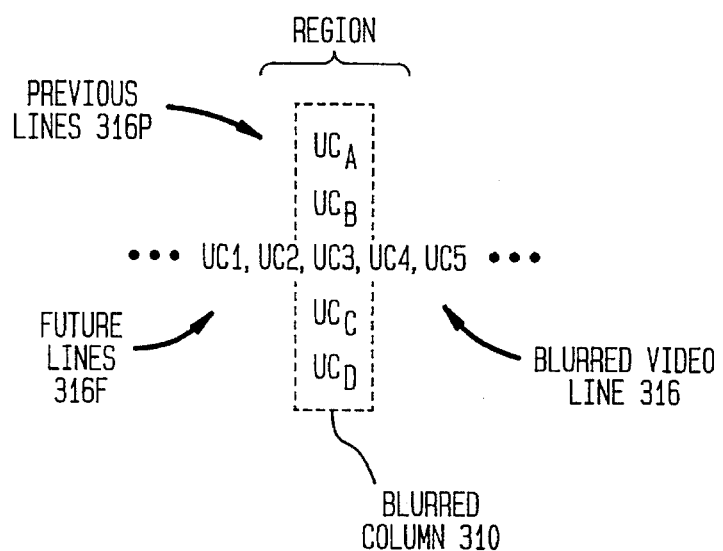
FIG. 8 illustrates a column of a blurred line.

The manner in which the Y blur kernel for a region of the line 316 is calculated will now be described in greater detail with reference to FIG. 8. FIG. 8 illustrates a portion of the blurred line 316. This blurred line has a region which contains 5 pixel values, that is, UC1, UC2, UC3, UC4 and UC5. In calculating the Y blur kernel for this region, the image unsteadiness compensator 312 uses the middle pixel, which in this case, is UC3. To calculate the Y blur kernel for this region, the image unsteadiness compensator 312 uses values from previous video lines 316P and future lines 316F which are in the same column 310 as pixel UC3.

As shown in FIG. 8, $UC_A$, $UC_B$, $UC_C$, and $UC_D$ from blurred column 310 are used to calculate the Y blur kernel for the region containing UC3 in the blurred video line 316. $UC_A$ and $UC_B$ exist in lines 316P which occurred before blurred line 316. $UC_C$ and $UC_D$ exist in lines 316F which occurred after the blurred line 316. Therefore, in order to calculate the blur kernel for the region in the blurred line 316, the image unsteadiness compensator 312 must maintain a memory of lines 316P which occurred before the blurred line 316 and lines 316F which occurred after the blurred line 316. According to the preferred embodiment of the present invention, image unsteadiness compensator 312 includes a memory sufficient to store 15 lines 316. Thus, the image unsteadiness compensator 312 calculates the blurred kernel for each region using 7 previous lines 316P and 7 future lines 316F. As evident from the above discussion, the image unsteadiness compensator 312 cannot compensate the blurred line 316 until after the future lines 316F occur.

In step 408, correction of blurred video lines image unsteadiness compensator 312 uses the X and Y blur kernels calculated in the previous steps to correct blurred video line 316 to generate corrected video line 318. The present invention includes two embodiments for performing step 408: a spatial approach and a frequency approach. These are described in detail in the following sections with reference to FIGS. 9–12. Step 408, correct blurred video lines, is illustrated as the entry point into each of these flowcharts.

A. Spatial Approach

Figure 9:
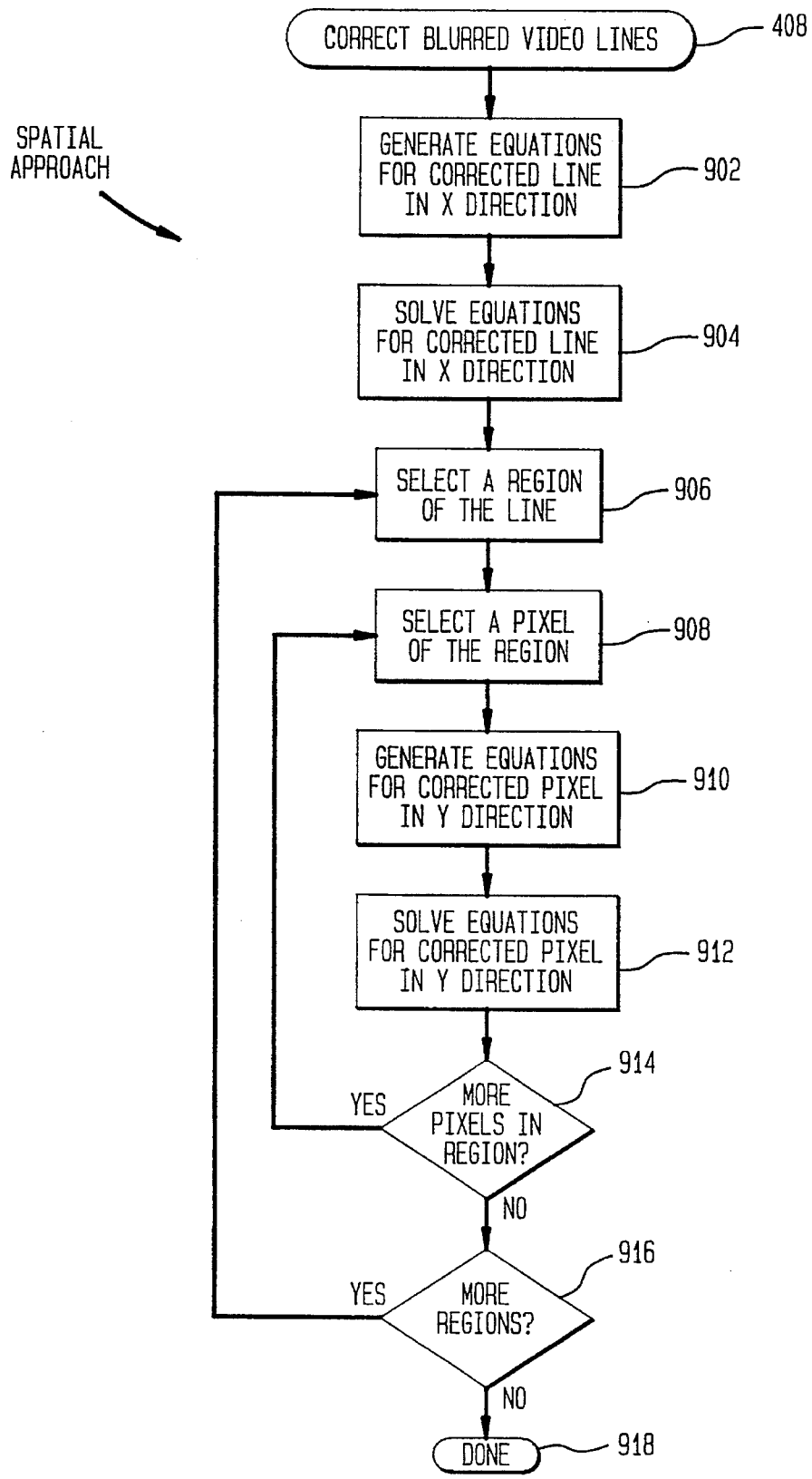
FIG. 9 illustrates a flow chart of the operation of a spatial approach of the present invention.

FIG. 9 illustrates a flow chart of the operation of the spatial approach of the present invention. The spatial approach views the deconvolution problem as a set of linear equations and performs a matrix solution to obtain corrected video line 318.

In step 902, image unsteadiness compensator 312 uses the pixel values of blurred video line 316 and the X blur kernel (calculated in step 608 of FIG. 6) to generate a set of linear equations for the corrected video line 318 in the X direction. FIG. 10 illustrates an example matrix equation which is used to calculate the set of linear equations. The matrix equation shown in FIG. 10 includes a coefficient matrix 1002, a variable array 1004, and a results array 1006.

The coefficients matrix 1002 is a J by K matrix, wherein J is equal to the number of pixels in each TDI stage 308. In the preferred embodiment, J is 4000. K is equal to the size of the variable array 1004. Each row of the coefficients matrix 802 includes the X blur kernel ($K_1$ and $K_2$, for example) followed and/or preceded by a series of zeros.

The variable array 1004 has a size equal to J+1. The variables $C_1, C_2, \ldots, C_{10}$ in variable array 1004 represent the pixel values of corrected video line 318. As shown in FIG. 10, variable array 1004 includes a dummy value D.

Dummy value D is required to implement the matrix equation shown in FIG. 10 (since the X blur kernel is two digits (that is, $K_1$ and $K_2$), the coefficients matrix 1002 J dimension is not equal to its K dimension).

The results array 1006 has a size equal to J. The values of the results array (that is, $UC_1, UC_2, \ldots, UC_{10}$) represent the pixel values from the blurred video line 316.

In step 902, therefore, image unsteadiness compensator 312 performs well-known matrix algebra operations on the matrices shown in FIG. 10 in order to generate the set of linear equations.

In step 904, image unsteadiness compensator 312 solves the set of linear equations for the pixel values of the corrected video line 318 (that is, the variables in the variable array 1004) with regard to disturbances in the X direction. The following steps in the spatial approach of the present invention operate to correct the blurred video line 316 with regard to disturbances in the Y direction.

In step 906, image unsteadiness compensator 312 selects one of the regions of the blurred line 316. In step 908, image unsteadiness compensator 312 selects one of the pixels in the selected region. In steps 910 and 912, image unsteadiness compensator 312 operates to correct the pixel selected in step 908 for disturbances in the Y direction.

Specifically, in step 910, image unsteadiness compensator 312 generates a set of linear equations for the selected pixel in the Y direction. The set of linear equations are generated using a matrix equation as shown in FIG. 10. In this instance, however, the coefficient matrix 1002 includes the Y blur kernel for the region selected in step 906. Also, the variables (that is, $C_1, C_2, \ldots, C_{10}$) in the variable array 1004 represent the corrected values of the pixels in the column 310 containing the pixel selected in step 908 (see FIG. 8). The values (that is, $UC_1, UC_2, \ldots, UC_{10}$) in the results array 1006 represent the blurred values of the pixels in the column 310 associated with the pixel selected in step 908 (see FIG. 8).

As noted above, image unsteadiness compensator 312 compensates the blurred line 316 in the Y direction using previous lines 316P and future lines 316F. In the preferred embodiment, the image unsteadiness compensator 312 uses an equal number of previous lines 316P and future lines 316F. Therefore, the corrected value of the pixel selected in step 608 is represented by the middle variable in the variable array 1004. Also, the element of the blurred line 316 corresponding to the pixel selected in step 908 is represented by the middle element of the results array 1006.

In step 912, the image unsteadiness compensator 312 solves the equations in order to determine the values of the variables in the variable array 1004. All of the values are discarded except the value corresponding to the pixel selected in 908. This value is the value which has been corrected in the X and Y directions. The image unsteadiness compensator 312 outputs this value in its appropriate position in the corrected line 318.

As indicated by step 914, steps 908, 910 and 912 are executed for each pixel in the region. As indicated by step 916, steps 908, 910, 912 and 914 are executed for each region in blurred video line 316.

In the preferred embodiment of the present invention, the linear matrix operations of the spatial approach are performed by general purpose computers. Such general purpose computers are well known to those skilled in the art.

B. Frequency Approach

Figure 11:
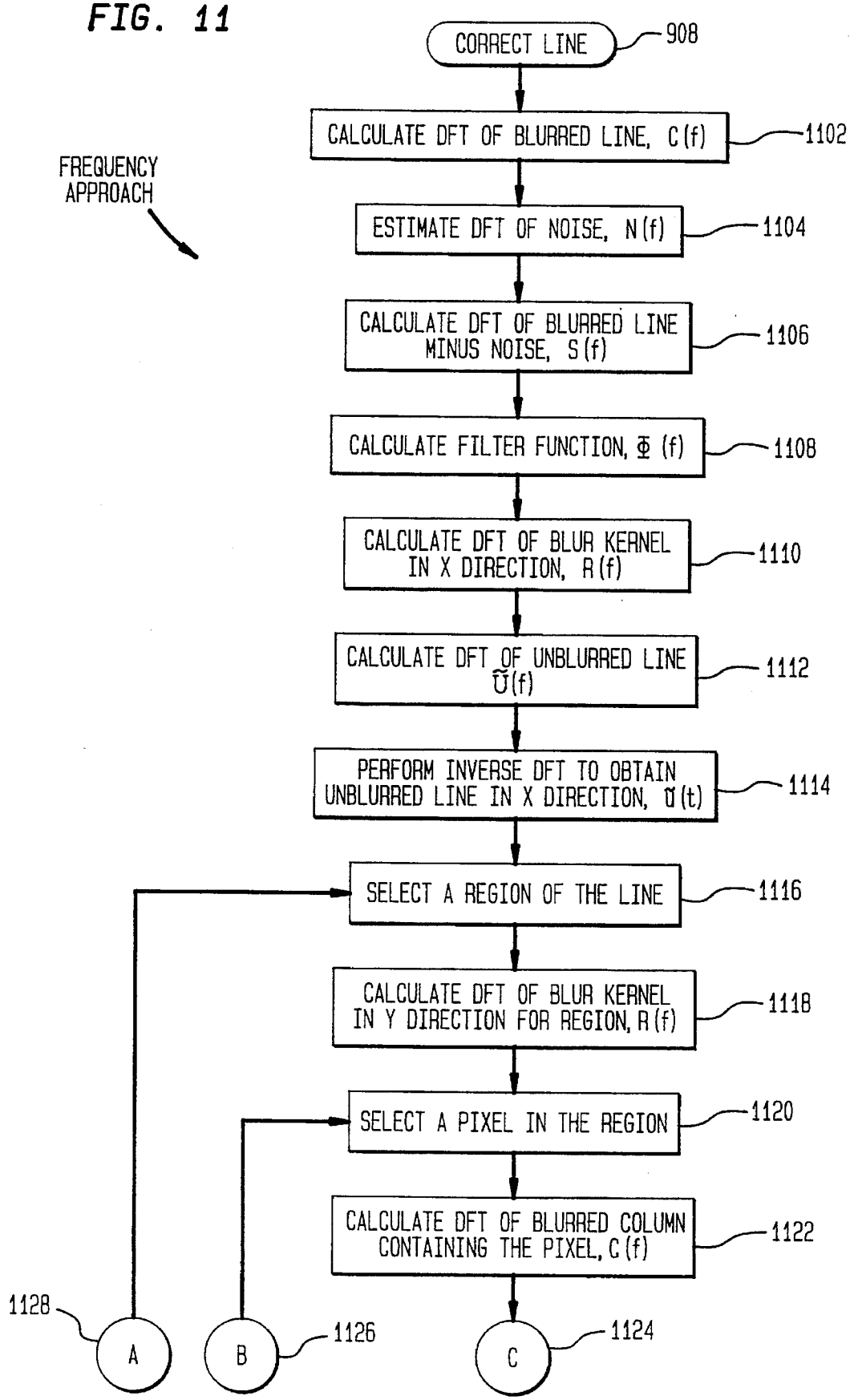
FIGS. 11 and 12 collectively illustrate a flow chart of a frequency approach of the present invention.
Figure 12:
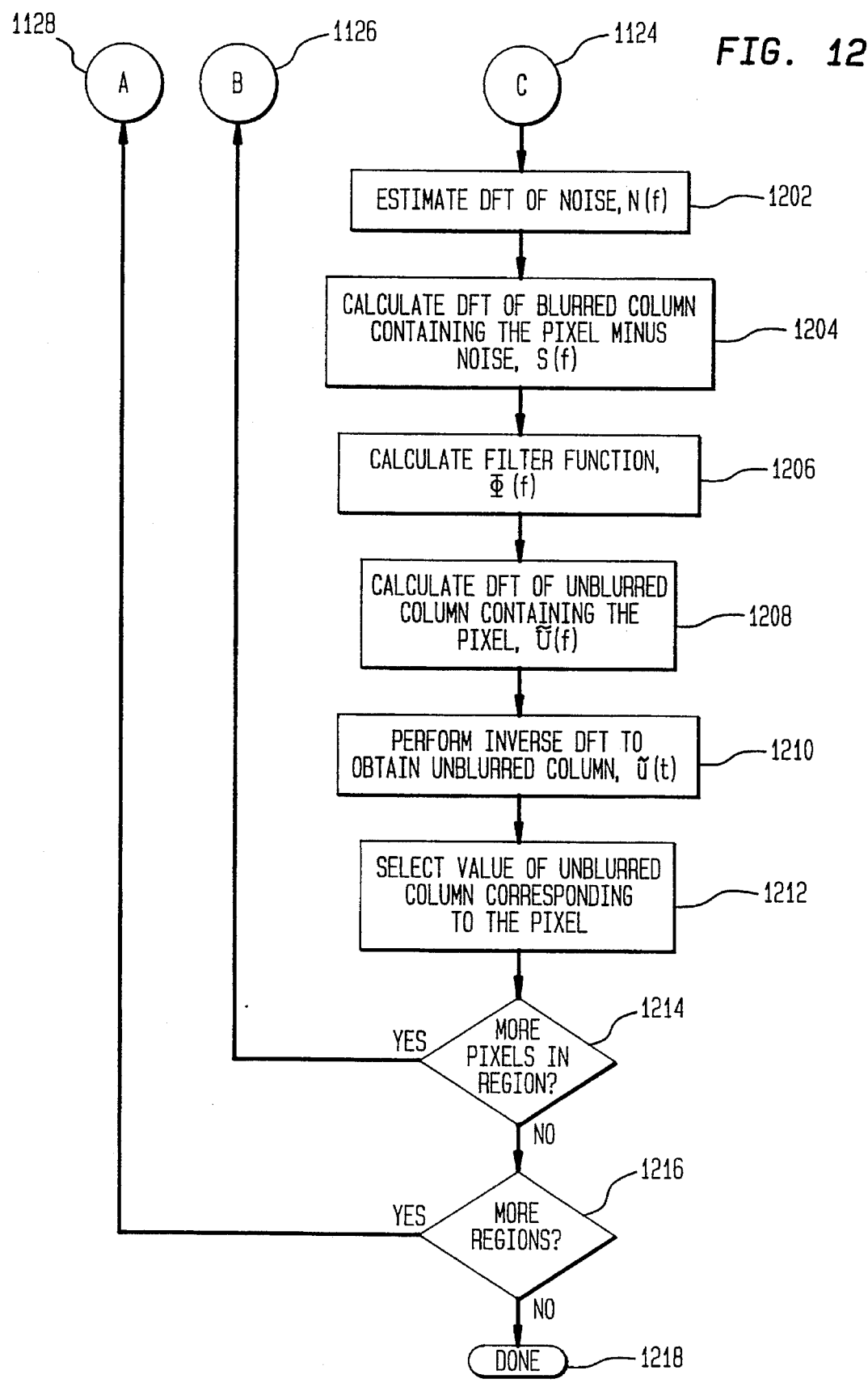

FIGS. 11 and 12 collectively illustrate a flow chart of the frequency approach used in the present invention to correct blurred video line 316. The frequency approach views the deconvolution problem as a problem in the frequency domain. Thus, according to the frequency approach, the deconvolution of the blurred video line 316 is performed using Wiener filtering in the frequency domain. The Wiener filtering requires Fourier transform processing. According to the preferred embodiment, the Fourier transform processing is implemented using Fourier processors. Such Fourier processors are well known to those skilled in the relevant art.

Referring now to FIGS. 11 and 12, in step 1102 the image unsteadiness compensator 312 calculates C(f), which is the digital Fourier transform (DFT) of blurred video line 316.

In step 1104, image unsteadiness compensator 312 estimates N(f), which is the DFT of noise. According to the preferred embodiment, a white noise model is used. Therefore, no actual calculations are required to calculate N(f). Rather, N(f) is a constant amplitude.

In step 1106, image unsteadiness compensator 312 uses C(f) and N(f) to calculate S(f), which is the DFT of blurred video line 316 minus the DFT of the noise. In step 1108, image unsteadiness compensator 312 calculates a filter function Φ(f) according to the following equation:

$$\Phi(f) = \frac{|S(f)|^2}{|S(f)|^2 + |N(f)|^2} \quad \text{(Equation 4)}$$

In step 1110, image unsteadiness compensator 312 calculates R(f), which is the DFT of the X blur kernel of blurred video line 316. In step 1112, image unsteadiness compensator 312 calculates $\tilde{U}(t)$, which is the DFT of the corrected line 318. This is done according to the following equation:

$$\tilde{U}(f) = \frac{C(f)\Phi(f)}{R(f)} \quad \text{(Equation 5)}$$

In step 1114, image unsteadiness compensator 312 performs an inverse DFT on $\tilde{U}(f)$ to obtain $\tilde{u}(t)$, which represents the blurred video line 316 corrected in the X direction (hereinafter called the partially corrected blurred video line 316). The remaining steps of the frequency approach are performed in order to correct the partially corrected blurred video line 316 in the Y direction.

In step 1116, image unsteadiness compensator 312 selects a region of partially corrected blurred video line 316. In step 1118, image unsteadiness compensator 312 calculates R(f), which is the DFT of the Y blur kernel for the region selected in step 916. In step 1120, image unsteadiness compensator 312 selects one of the pixels in the selected region. Then, image unsteadiness compensator 312 calculates C(f) in step 1122, which is the DFT of the blurred column which contains the selected pixel. For example, in FIG. 8, if UC₃ is the selected pixel, then during step 1122, the image unsteadiness compensator 312 would calculate the DFT of blurred column 310.

Next, processing continues through connector C1124, image unsteadiness compensator 312 estimates N(f) in step 1202, which is the DFT of noise. This step is similar to step 1104 described above. In step 1204, image unsteadiness compensator 312 calculates S(f), which is the DFT of the blurred column (containing the selected pixel) minus noise. In step 1206, image unsteadiness compensator 312 calculates Φ(f) according to Equation (4) above. Next, image unsteadiness compensator 312 calculates $\tilde{U}(f)$, which is the DFT of the unblurred column containing the selected pixel, in step 1208. This is done according to Equation (5), above.

In step 1210, image unsteadiness compensator 312 performs an inverse DFT on $\tilde{U}(f)$ to obtain $\tilde{u}(t)$, which is the unblurred column. In step 1212, image unsteadiness compensator 312 selects the value from the unblurred column $\tilde{u}(t)$ corresponding to the pixel selected in step 1120. This value, representing the corrected value of the pixel selected in step 1120, is output as part of the corrected video line 318.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a camera imager having a charge accumulation device having multiple stages, each of the stages having multiple rows for storing electrical charges representing a sensed image, the electrical charges blurred due to motion of the camera imager, a method for correcting a blurred video line comprising pixel values proportional to the blurred charges in one of the rows, said method comprising the steps of:

(1) receiving an image produced by a scanning sensor at each of the multiple rows of the multiple stages of the charge accumulation device, said image represented by a charge value in each of the multiple rows;

(2) transferring said image through the multiple stages of the charge accumulation device to result in a summed charge for each of the multiple rows;

(3) transferring said summed charge at each of the multiple rows to a shift register to result in a blurred video line;

(4) receiving said blurred video line by an image unsteadiness compensator coupled to said shift register;

(5) receiving, by said image unsteadiness compensator, motion information from sensors coupled to said image unsteadiness compensator, said motion information describing the motion of the camera imager;

(6) computing image wander of the blurred charges by using said motion information, including the steps of,
      (a) computing a forward motion correction error by using said motion information,
      (b) calculating an X position change of said blurred charges by using said forward motion correction error,
      (c) computing an X blur kernel by using said X position change,
      (d) dividing the blurred video line into one or more regions, wherein each of said regions comprises one or more of the pixel values, and
      (e) computing a Y blur kernel for each of said regions; and (7) generating, by the image unsteadiness compensator, a corrected video line by using said image wander computation to correct said blurred video line, said blurred video line is a convolution of a corrected video line and said X blur kernel and said Y blur kernel, said corrected video lines generated by deconvolving said blurred video line to form said corrected video line being using said X blur kernel and said Y blur kernel.

2. The method of claim 1, wherein said deconvolving step comprises the steps of:

(i) forming a coefficients matrix comprising elements equal to said X blur kernel;

(ii) forming a variable array comprising J variables, wherein said variables comprise pixel values of said corrected video line;

(iii) forming a results array comprising J known values, wherein said known values comprise said pixel values of said blurred video line;

(iv) generating a set of linear equations according to a matrix algebra equation:

(coefficients matrix)*(variable array)=results array; and (v) solving said linear equations for said variables.

3. The method of claim 1, wherein said deconvolving step comprises the steps of:

(i) calculating C(f), representing a Fourier transform of said blurred video line;

(ii) estimating N(f), representing a Fourier transform of noise;

(iii) calculating S(f), representing a Fourier transform of said blurred video line minus said noise;

(iv) calculating Φ(f), representing a filter function, according to a first equation:

$$\Phi(f) = \frac{|S(f)|^2}{|S(f)|^2 + |N(f)|^2}$$

(v) calculating R(f), representing a Fourier transform of said X blur kernel;

(vi) calculating $\tilde{U}(f)$, representing a Fourier transform of said corrected video line, according to a second equation:

$$\tilde{U}(f) = \frac{C(f)\Phi(f)}{R(f)}$$

(vii) calculating $\tilde{u}(f)$, representing said corrected video line, by performing an inverse Fourier transform on $\tilde{U}(f)$.

4. The method of claim 1, further comprising the step of:

(8) storing video information representing the sensed image.

5. The method of claim 4, wherein said storing step (8) comprises the steps of:

(a) storing video lines occurring before said blurred video line;

(b) storing said blurred video line; and (c) storing video lines occurring after said blurred video line.

6. The method of claim 1, wherein said step for computing a Y blur kernel for each of said regions comprises the steps of:

(a) computing a roll error;

(b) selecting one of said regions;

(c) selecting one of the pixel values in said selected region;

(d) computing a rotation error for said selected region by using an X position of said selected pixel value;

(e) calculating a Y position change for said selected region by adding said roll error and rotation error;

(f) computing a Y blur kernel for said selected region by using said Y position change; and (g) performing steps (b)–(f) for each of said regions.

7. The method of claim 1, wherein said deconvolving step comprises the steps of:

(a) selecting one of said regions;

(b) selecting one of the pixel values in said selected region, wherein said selected pixel value has an X position;

(c) forming a coefficients matrix comprising elements equal to said Y blur kernel associated with said selected region;

(d) forming a variable array comprising J variables, wherein said variables comprise pixel values of said corrected video line;

(e) forming a results array comprising J known values, wherein said known values comprise said selected pixel value and pixel values from said video information having said X position;

(f) generating a set of linear equations according to a matrix algebra equation:

(coefficients matrix)*(variable array)=results array;

(g) solving said linear equations for said variables;

(h) performing steps (b)–(g) for each of said pixels in said selected region; and (i) performing steps (a)–(h) for each of said regions.

8. The method of claim 1, wherein said deconvolving step comprises the steps of:

(a) selecting one of said regions;

(b) selecting one of the pixel values in said selected region, wherein said selected pixel value has an X position;

(c) calculating C(f), representing a Fourier transform of a blurred column comprising said selected pixel value and pixel values from said video information having said X position;

(d) estimating N(f), representing a Fourier transform of noise;

(e) calculating S(f), representing a Fourier transform of said blurred column minus said noise;

(f) calculating Φ(f), representing a filter function, according to a first equation:

$$\Phi(f) = \frac{|S(f)|^2}{|S(f)|^2 + |N(f)|^2}$$

(g) calculating R(f), representing a Fourier transform of said Y blur kernel associated with said selected region;

(h) calculating $\tilde{U}(f)$, representing a Fourier transform of a corrected column, according to a second equation:

$$\tilde{U}(f) = \frac{C(f)\Phi(f)}{R(f)}$$

(i) calculating $\tilde{u}(f)$, representing said corrected column, by performing an inverse Fourier transform on $\tilde{U}(f)$;

(j) performing steps (b)–(i) for each of said pixels in said selected region; and (k) performing steps (a)–(j) for each of said regions.

9. A camera imager, comprising:

a charge accumulation device configured to store a row of electrical charges representing a sensed image, said electrical charges blurred due to motion of the camera imager;

a shift register, coupled to said charge accumulation device, for generating a blurred video line by concatenating said blurred charges, wherein said blurred video line comprises pixel values proportional to said blurred charges;

an image unsteadiness compensator, coupled to said charge accumulation device and said shift register, for correcting said blurred video line, said correcting means comprising:

means for computing image wander of said blurred charges by using said motion information, including,
means for computing a forward motion correction error by using said motion information, means for calculating an X position change of said blurred charges by using said forward motion correction error, means for computing an X blur kernel by using said X position change, means for dividing the blurred video line into one or more regions, wherein each of said regions comprises one or more of the pixel values, and means for computing a Y blur kernel for each of said regions, wherein said blurred video line is a convolution of a corrected video line and said X blur kernel and said Y blur kernel; and means for generating a corrected video line from said blurred video line by deconvolving said blurred video line to form said corrected video line by using said X blur kernel and said Y blur kernel.

10. The camera imager of claim 9, wherein said deconvolving means comprises:

(i) means for calculating C(f), representing a Fourier transform of said blurred video line;

(ii) means for estimating N(f), representing a Fourier transform of noise;

(iii) means for calculating S(f), representing a Fourier transform of said blurred video line minus said noise;

(iv) means for calculating Φ(f), representing a filter function, according to a first equation:

$$\Phi(f) = \frac{|S(f)|^2}{|S(f)|^2 + |N(f)|^2},$$

(v) means for calculating R(f), representing a Fourier transform of said X blur kernel;

(vi) means for calculating $\tilde{U}(f)$, representing a Fourier transform of said corrected video line, according to a second equation:

$$\tilde{U}(f) = \frac{C(f)\Phi(f)}{R(f)}$$

(vii) means for calculating $\tilde{u}(f)$, representing said corrected video line, by performing an inverse Fourier transform on $\tilde{U}(f)$.

11. The camera imager of claim 9, wherein said means for computing a Y blur kernel for each of said regions comprises:

means for computing a roll error;

means for selecting one of said regions;

means for selecting one of the pixel values in said selected region;

means for computing a rotation error for said selected region by using an X position of said selected pixel value;

means for calculating a Y position change for said selected region by adding said roll error and rotation error; and means for computing a Y blur kernel for said selected region by using said Y position change.

12. The camera imager of claim 9, wherein said means for generating a corrected video line generates and solves a set of linear equations according to a matrix algebra equation: (coefficients matrix)*(variable array)=results array, said coefficients matrix comprising elements equal to said X blur kernel, said variable array comprising J variables, wherein said variables comprise pixel values of said corrected video line, said results array comprising J known values, wherein said known values comprise said pixel values of said blurred video line.

13. The camera imager of claim 12, wherein said means for generating a corrected video line comprises one or more general purpose processors for performing matrix algebra.

14. The camera imager of claim 9, wherein said means for deconvolving calculates a Φ(f), representing a filter function, according to a first equation:

$$\Phi(f) = \frac{|S(f)|^2}{|S(f)|^2 + |N(f)|^2},$$

wherein C(f), representing a Fourier transform of said blurred video line, N(f) represents a Fourier transform of noise, S(f), represents a Fourier transform of said blurred video line minus said noise, and wherein said means for deconvolving calculates $\tilde{U}(f)$ representing a Fourier transform of said corrected video line, according to a second equation:

$$\tilde{U}(f) = \frac{C(f)\Phi(f)}{R(f)}$$

said R(f) representing a Fourier transform of said X blur kernel, and wherein said means for deconvolving calculates $\tilde{u}(f)$ representing said corrected video line, by performing an inverse Fourier transform on $\tilde{U}(f)$.

15. The camera imager of claim 14, wherein said means for generating a corrected video line comprises one or more Fourier processors for performing Fourier transforms and inverse Fourier transforms.

16. The electronic imager of claim 9, wherein said means for computing image wander of said blurred charges determines said Y blur kernel for each of said regions using a Y position change, said Y position change determined by adding a roll error and a rotation error for said selected region, said rotation error determined by using an X position of said selected pixel value.

17. The camera imager of claim 16, wherein for each pixel value of a selected one of said regions, said selected pixel value has an X position, said means for deconvolving generates and solves a set of linear equations according to a matrix algebra equation: (coefficients matrix)*(variable array)=results array, said coefficients matrix comprising elements equal to said Y blur kernel associated with said selected region, said variable array comprising J variables, each comprising pixel values of said corrected video line, said results array comprising J known values, each comprising said selected pixel value and pixel values from said video information having said X position.

18. The camera imager of claim 16, wherein said means for deconvolving calculates a Φ(f), representing a filter function, according to a first equation:

$$\Phi(f) = \frac{|S(f)|^2}{|S(f)|^2 + |N(f)|^2},$$

wherein C(f), representing a Fourier transform of said blurred video column, N(f) represents a Fourier transform of noise, S(f), represents a Fourier transform of said blurred video column minus said noise, and wherein said means for deconvolving calculates $\tilde{U}(f)$ representing a Fourier transform of said corrected video column, according to a second equation:

$$\tilde{U}(f) = \frac{C(f)\Phi(f)}{R(f)}$$

said R(f) representing a Fourier transform of said Y blur kernel associated with said selected region, and wherein said means for deconvolving calculates $\tilde{u}(f)$ representing said corrected video column, by performing an inverse Fourier transform on $\tilde{U}(f)$.

* * * * *